(12) United States Patent
Yokoyama et al.

(10) Patent No.: US 6,688,274 B2
(45) Date of Patent: Feb. 10, 2004

(54) MOTORCYCLE INTAKE STRUCTURE

(75) Inventors: Kazuhiko Yokoyama, Saitama (JP); Takanori Okuma, Saitama (JP); Keisuke Inomoto, Saitama (JP); Shoji Yamamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 09/970,918

(22) Filed: Oct. 5, 2001

(65) Prior Publication Data

US 2002/0040699 A1 Apr. 11, 2002

(30) Foreign Application Priority Data

Oct. 6, 2000 (JP) ........................................ 2000-308397

(51) Int. Cl.[7] .............................................. F02M 35/04
(52) U.S. Cl. ................... 123/198 E; 180/219; 55/385.3
(58) Field of Search ........................ 123/184.21, 198 E; 180/219, 225, 228; 55/385.3

(56) References Cited

U.S. PATENT DOCUMENTS

| | | | | |
|---|---|---|---|---|
| 3,698,503 A | * | 10/1972 | Koyama | ..................... 180/219 |
| 4,280,582 A | * | 7/1981 | Kouyama et al. | ........... 180/219 |
| 4,648,474 A | * | 3/1987 | Shinozaki et al. | .......... 180/219 |
| 4,821,685 A | * | 4/1989 | Matsushima et al. | .. 123/184.47 |
| 5,609,658 A | * | 3/1997 | Takemura et al. | ......... 55/385.3 |
| 6,251,151 B1 | * | 6/2001 | Kobayashi et al. | ........... 55/309 |
| 6,283,242 B1 | * | 9/2001 | Umeoka et al. | ............. 180/219 |
| 6,290,016 B1 | * | 9/2001 | Umeoka | ..................... 180/219 |
| 6,306,190 B1 | * | 10/2001 | Tsuruta et al. | ............. 55/385.3 |
| 6,409,783 B1 | * | 6/2002 | Miyajima et al. | .......... 55/385.3 |

FOREIGN PATENT DOCUMENTS

| JP | 3-193583 P | 8/1991 | |
|---|---|---|---|
| JP | 165578 | * 6/1999 | ............ B62J/23/00 |

* cited by examiner

Primary Examiner—Hieu T. Vo
Assistant Examiner—Hai Huynh
(74) Attorney, Agent, or Firm—Birch, Stewart, Kolasch & Birch, LLP

(57) ABSTRACT

In a motorcycle intake structure, an air cleaner is provided under a sheet and an intake passage is connected to an upper opening of the air cleaner. The intake passage is formed by the sheet, a rear fender and a side cover. An inlet port from the outside of the intake passage opens rearward in a upper rear portion of the side cover. This motorcycle intake structure forms a smooth intake airflow with reduced intake resistance and free from influence by dirt or other debris.

16 Claims, 13 Drawing Sheets

MOTORCYCLE INTAKE STRUCTURE

BACKGROUND OF THE INVENTION

CROSS-REFERENCES TO RELATED APPLICATIONS

This nonprovisional application claims priority under 35 U.S.C. §119(a) on Patent Application No. 2001-308397 filed in Japan on Oct. 6, 2000, the entirety of which is herein incorporated by reference.

FIELD OF THE INVENTION

The present invention relates to a motorcycle intake structure, and more particularly to a motorcycle intake structure in which an air cleaner is provided under a sheet.

DESCRIPTION OF THE BACKGROUND ART

Japanese Published Unexamined Patent Application No. Hei 3-193583 describes an example of a motorcycle intake structure where air is introduced to an air cleaner under a sheet.

The publication describes a first exemplary structure having an upper end opening of an air cleaner box connected to a sheet bottom plate. A part of the connection portion on the vehicle-body front side is cut as an air inlet port.

A second example is shown in FIG. 15 of the present application, an air passage 02 is formed in a sheet 01, an air inlet port 03 in communication with the air passage 02 is provided in a side surface of the sheet 01, and a connection port 05, communicated with the air passage 02 and connectable to an upper opening of an air cleaner box 04, is formed in a bottom portion of the sheet 01.

In the first example, since the air intake port is provided frontward in a low position without a portion such as an air passage, dirt and debris easily enters the air intake port. Further, the dirt and debris may adhere to the air intake port.

In the second example, as the air inlet port 03 is provided in the side surface of the sheet 01 and the air inlet port 03 is opened sideward, the frontward airflow in the air passage 02 is vertically offset and normal to the inlet airflow in left-and-right direction drawn from the air inlet port 03. Accordingly, the airflow is disturbed and not smooth, and the resulting intake resistance is undesirably high.

Further, since the air passage 02, the air inlet port 03 and the connection port 05 are formed in the sheet 01, the sheet 01 is difficult to manufacture and assemble.

SUMMARY OF THE INVENTION

The present invention overcomes the shortcomings associated with the background art and achieves other advantages not realized by the background art.

An object of the present invention is to provide a motorcycle intake structure that forms a smooth intake airflow.

An object of the present invention is to provide a motorcycle intake structure that reduces intake resistance and prevents the accumulation of dirt and debris in the air inlet port and the flow of inlet air.

These and other objects are accomplished by a motorcycle intake structure comprising an air cleaner provided under a sheet and having an upper opening; a rear fender; a side cover having a rear upper portion; an intake passage operatively connecting the upper opening of the air cleaner, wherein the intake passage is integrally formed by the sheet, the rear fender and the side cover; and an external inlet port of the intake passage opening rearward in the rear upper portion of the side cover.

These and other objects are further accomplished by a motorcycle intake structure comprising a sheet and a sheet rail; a backstay integrally joined with the sheet rail; an air cleaner provided under the sheet and having an upper opening; a rear fender, wherein the air cleaner and the rear fender are attached to the sheet rail and the backstay; a side cover having a rear upper portion; an intake passage operatively connecting the upper opening of the air cleaner, wherein the intake passage is integrally formed by the sheet, the rear fender and the side cover; and an external inlet port of the intake passage opening rearward in the rear upper portion of the side cover.

Since the inlet port is opened rearward in the rear upper position of the side cover, air is linearly sucked into the intake passage inside the side cover. Accordingly, the intake airflow is smooth and the intake resistance is reduced.

Since the inlet port is in the rear upper position of the side cover, it is not influenced or contaminated by dirt or debris.

Further, since the intake passage is formed from the sheet, the rear fender and the side cover, separately dedicated members to form the intake passage are not required. The inlet port can be provided between a sheet rail and the sheet. Therefore, the sheet rail can be utilized as an intake guide, and the intake airflow can be transferred to a more laminar flow.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
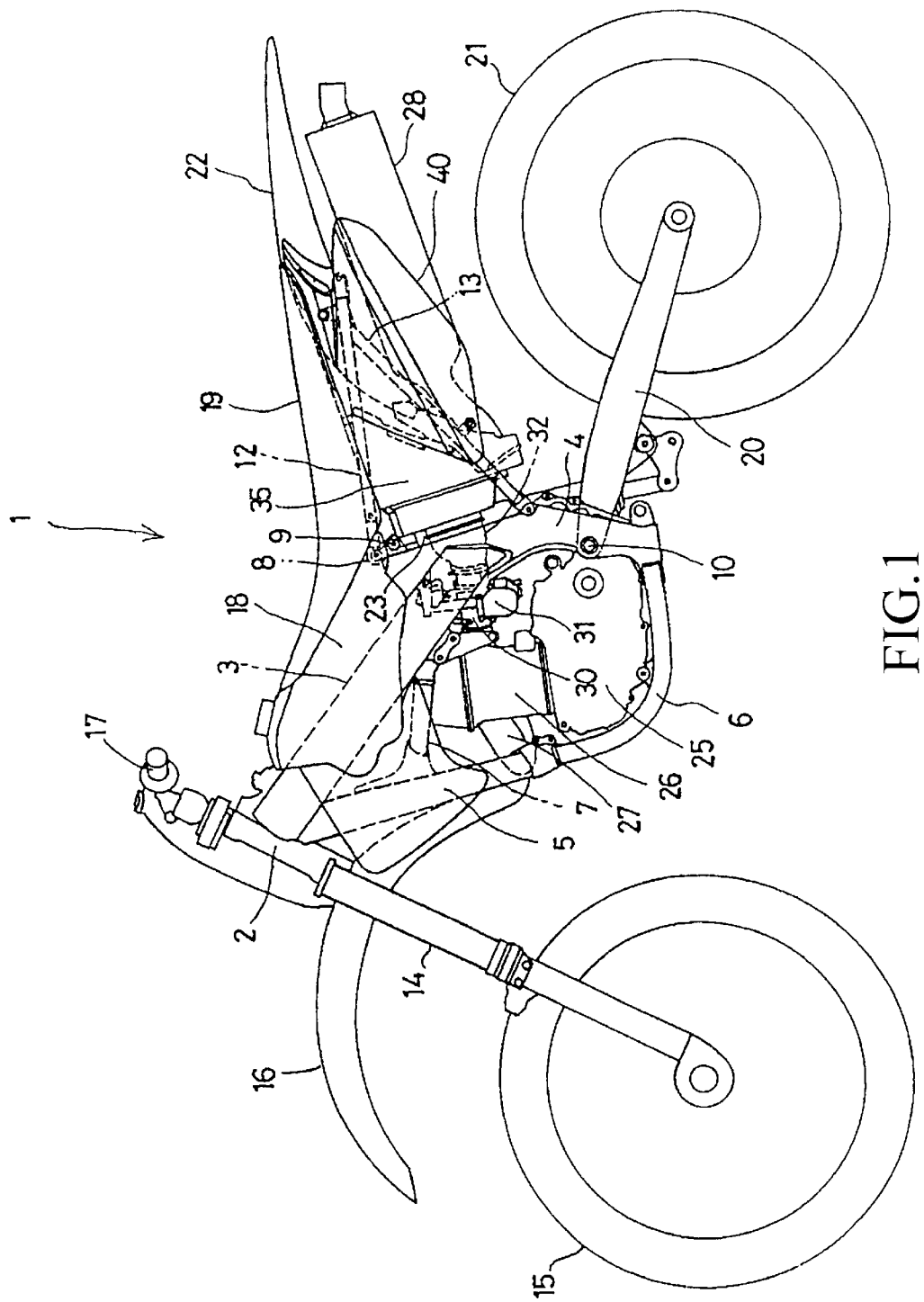
FIG. 1 is a side view of a motorcycle according to an embodiment of the present invention.
Figure 2:
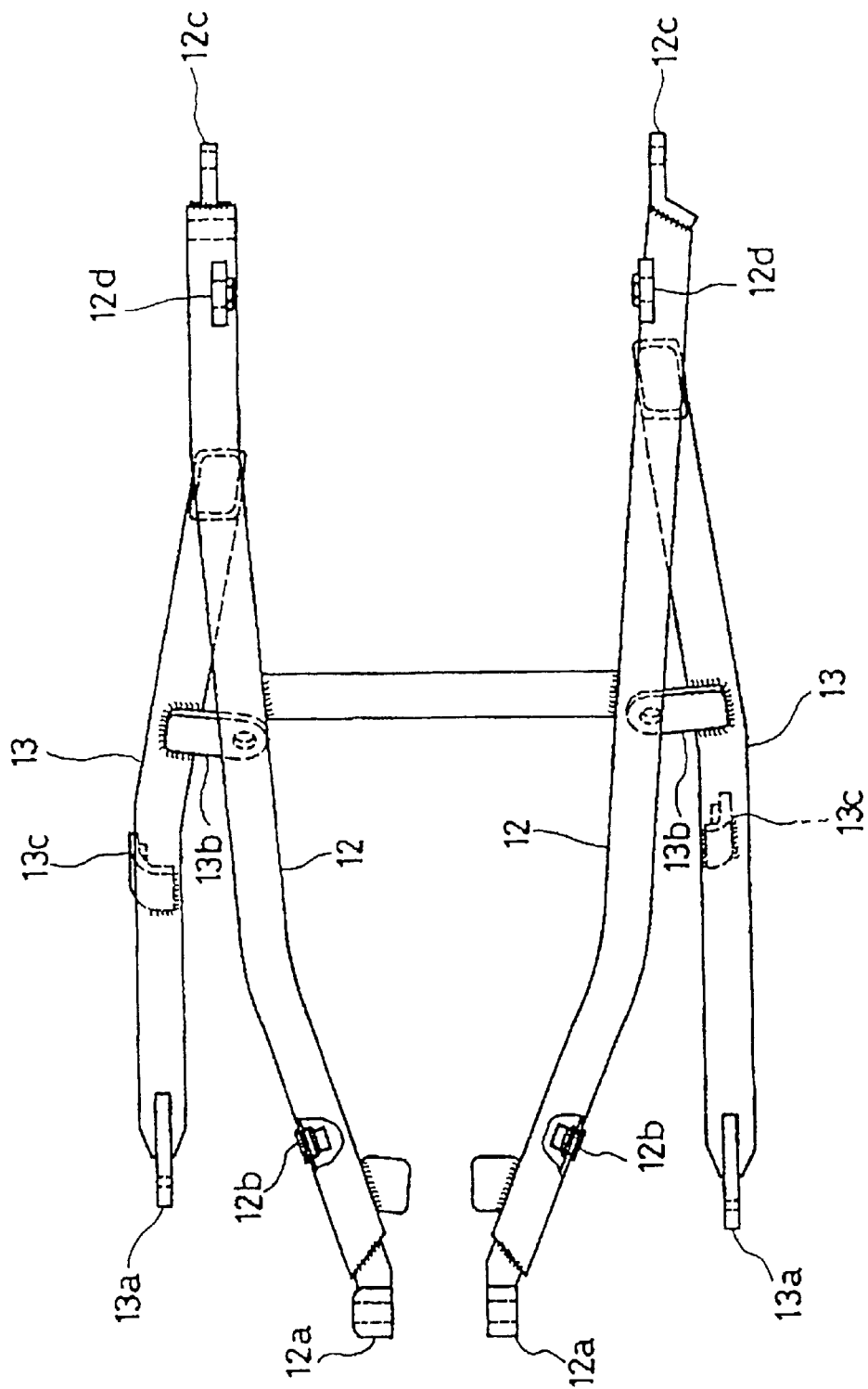
FIG. 2 is a plan view of a sheet rail and a backstay according to an embodiment of the present invention.
Figure 3:
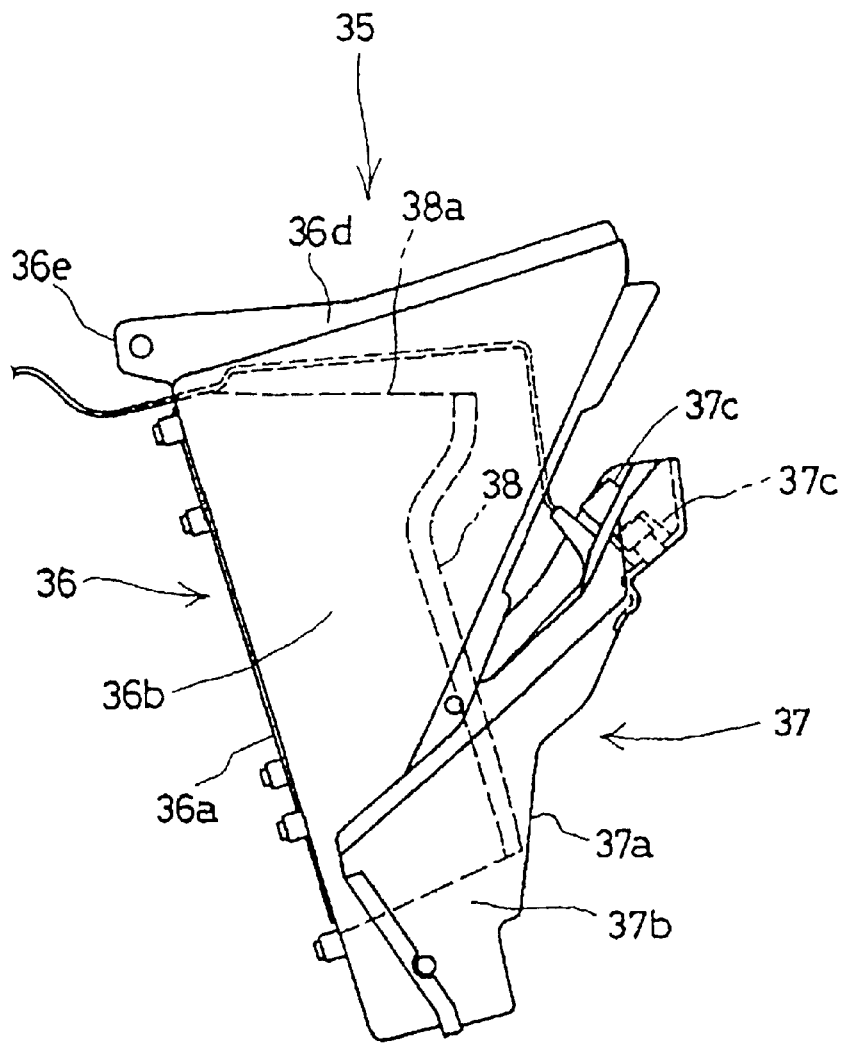
FIG. 3 is a plan view of an air cleaner according to an embodiment of the present invention.
Figure 4:
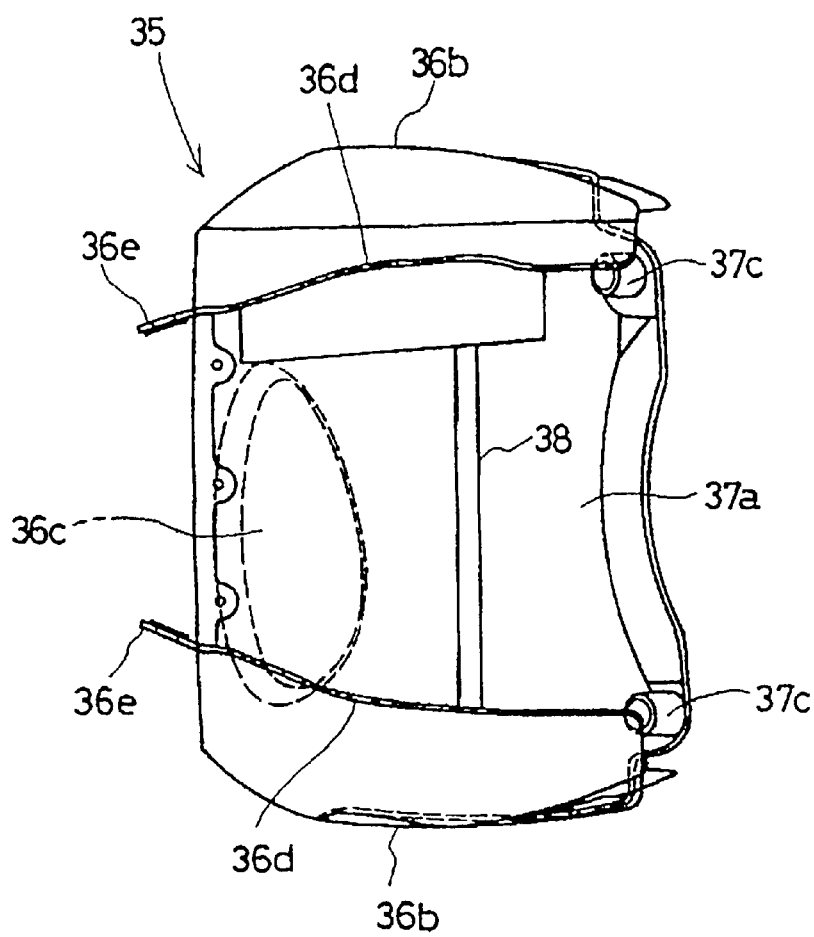
FIG. 4 is a side view of an air cleaner according to an embodiment of the present invention.
Figure 5:
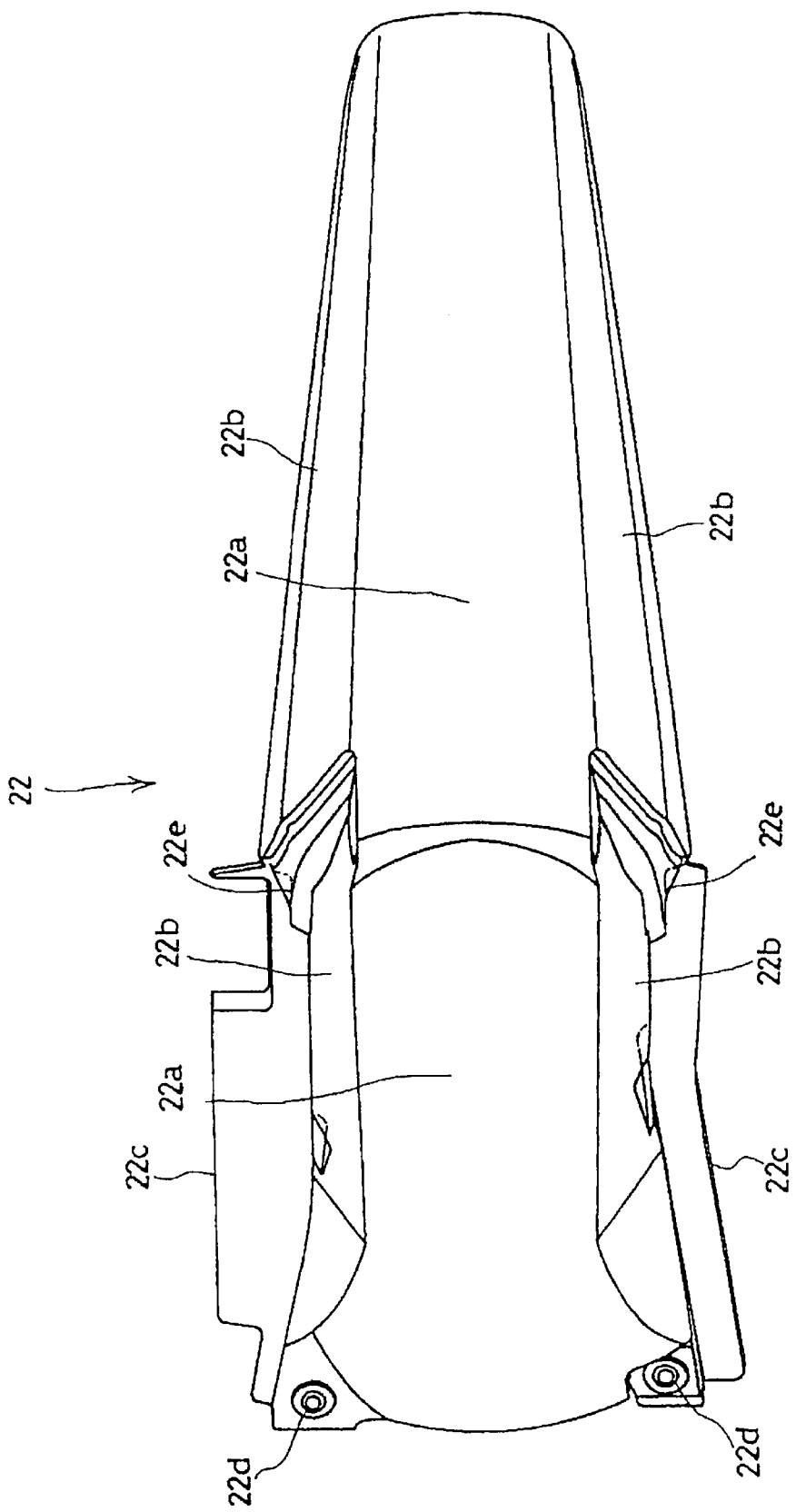
FIG. 5 is a plan view of a rear fender according to an embodiment of the present invention.
Figure 6:
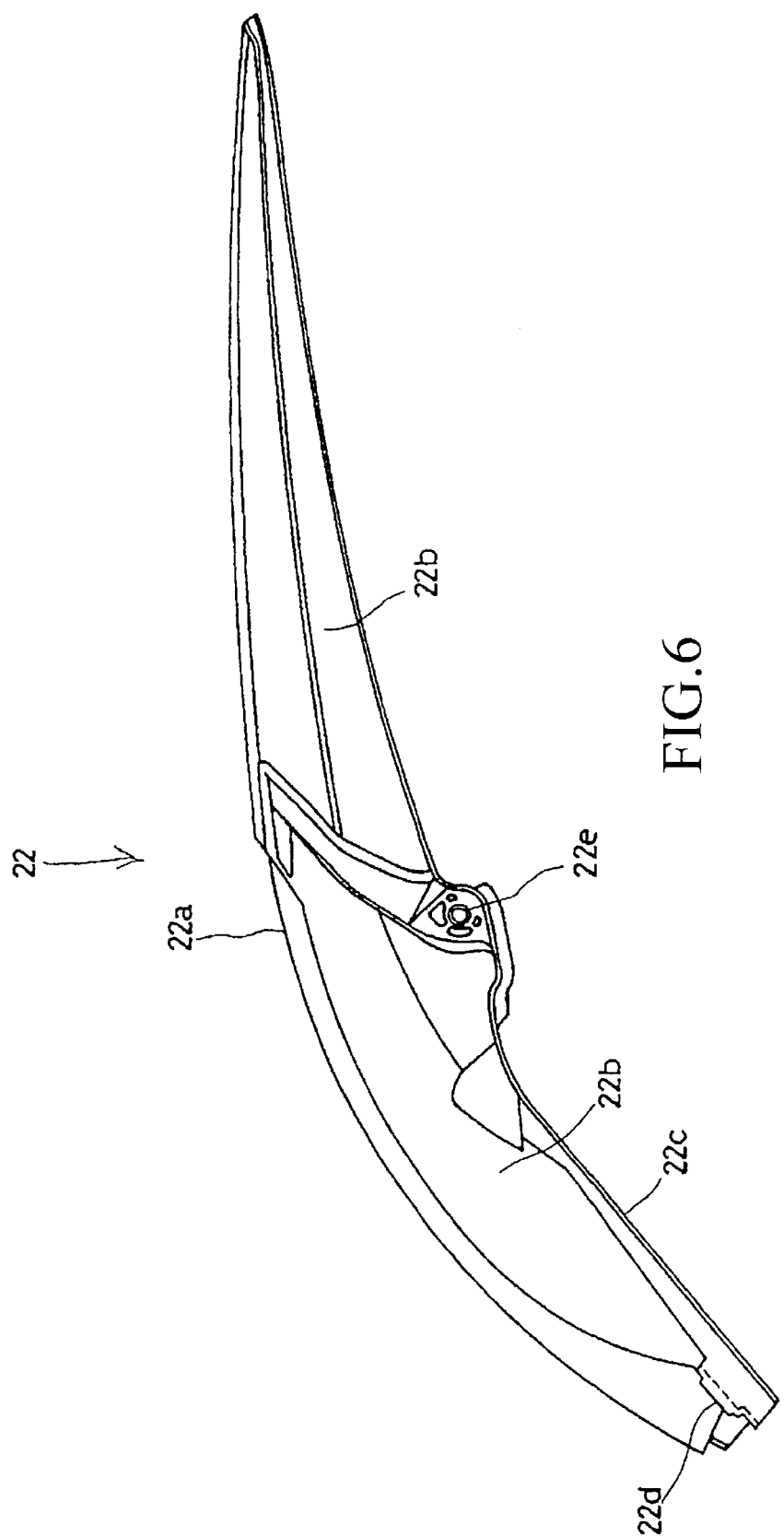
FIG. 6 is a side view of a rear fender according to an embodiment of the present invention.
Figure 7A:
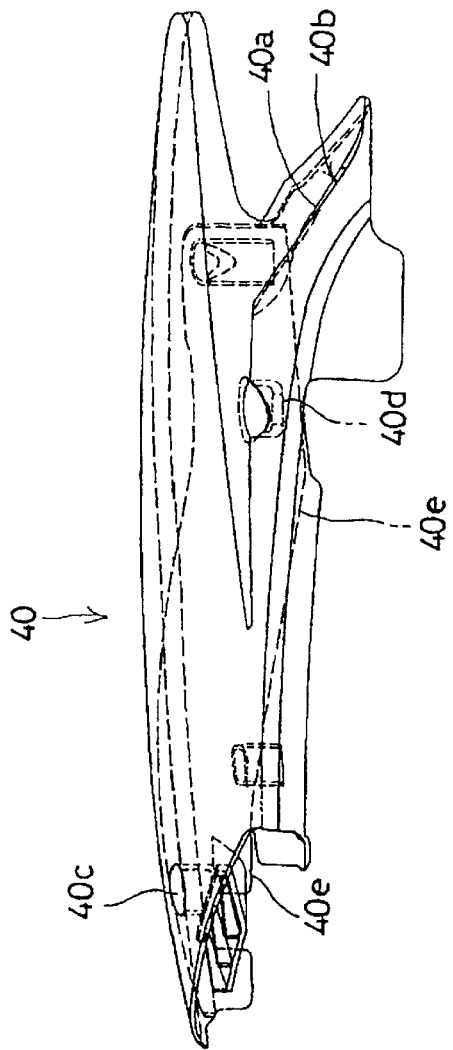
FIGS. 7(a)–7(b) are plan views of a side cover according to an embodiment of the present invention.
Figure 7B:
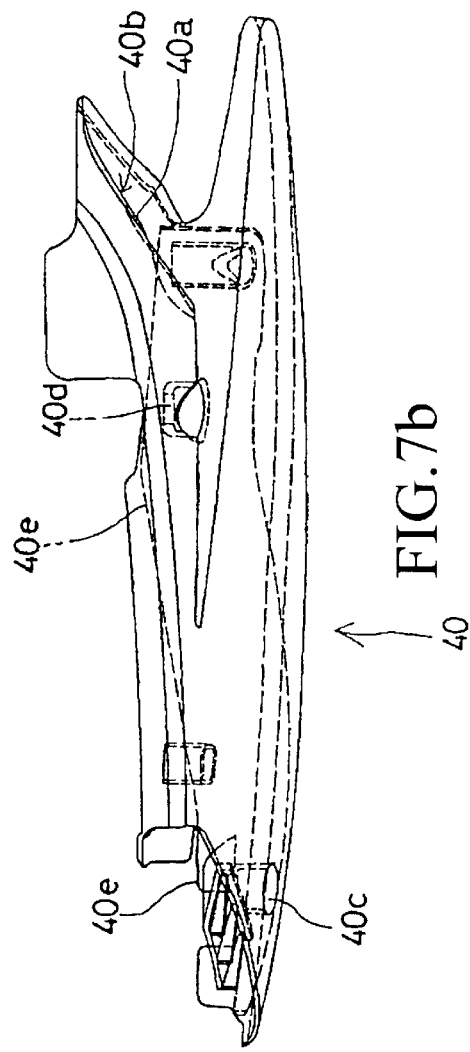
Figure 8:
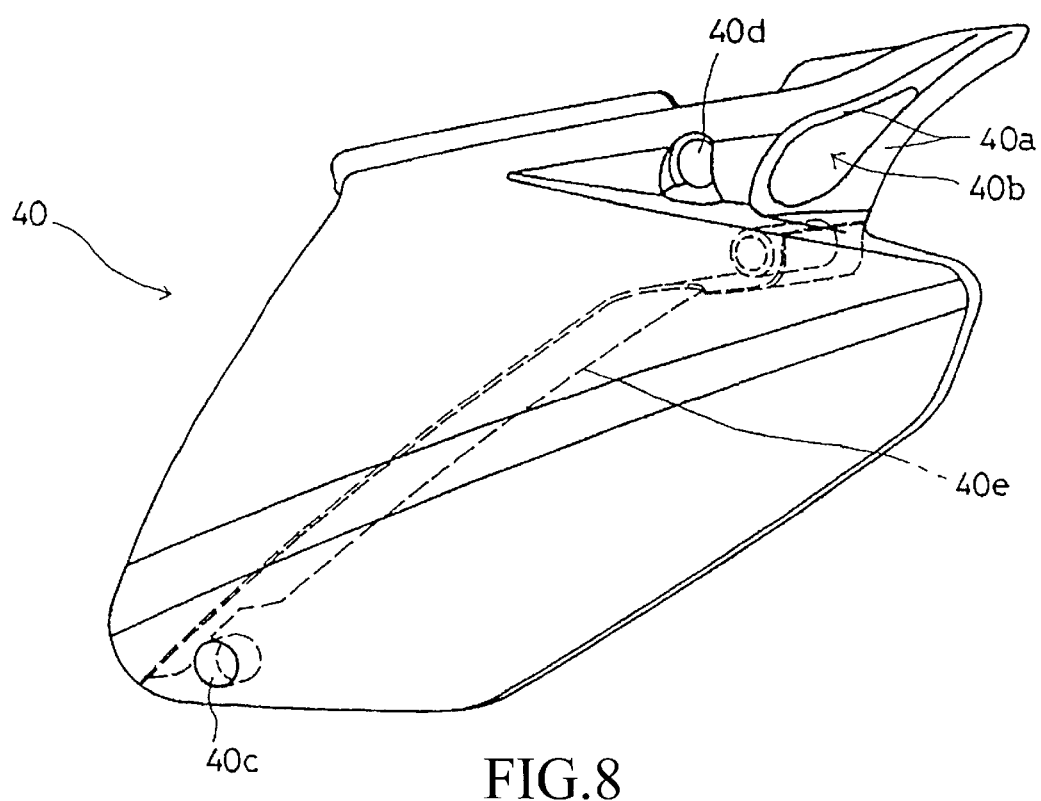
FIG. 8 is a perspective view of a left side cover according to an embodiment of the present invention.
Figure 9:
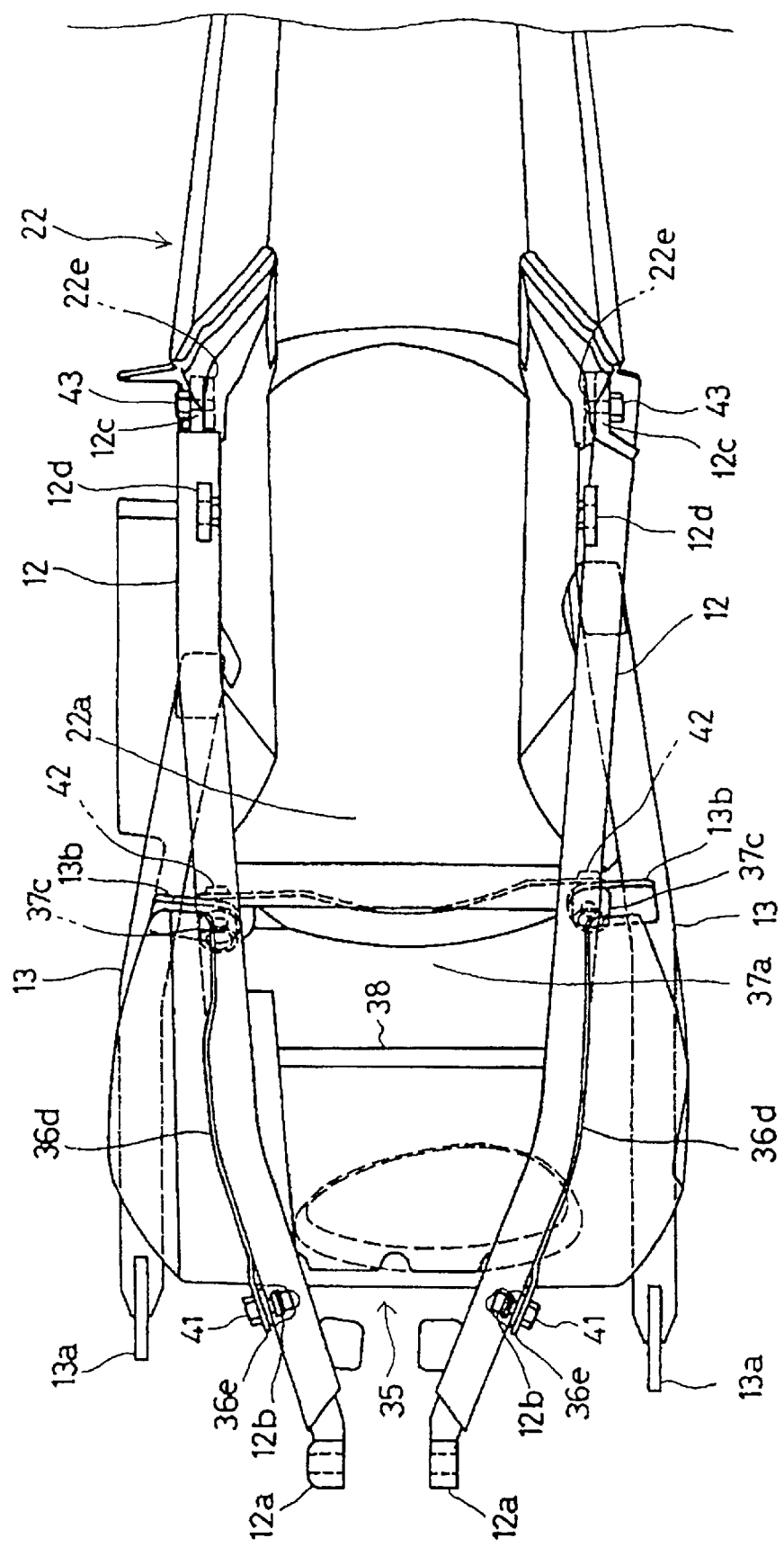
FIG. 9 is a plan view showing an air cleaner and a rear fender attached to the sheet rail and the backstay.
Figure 10:
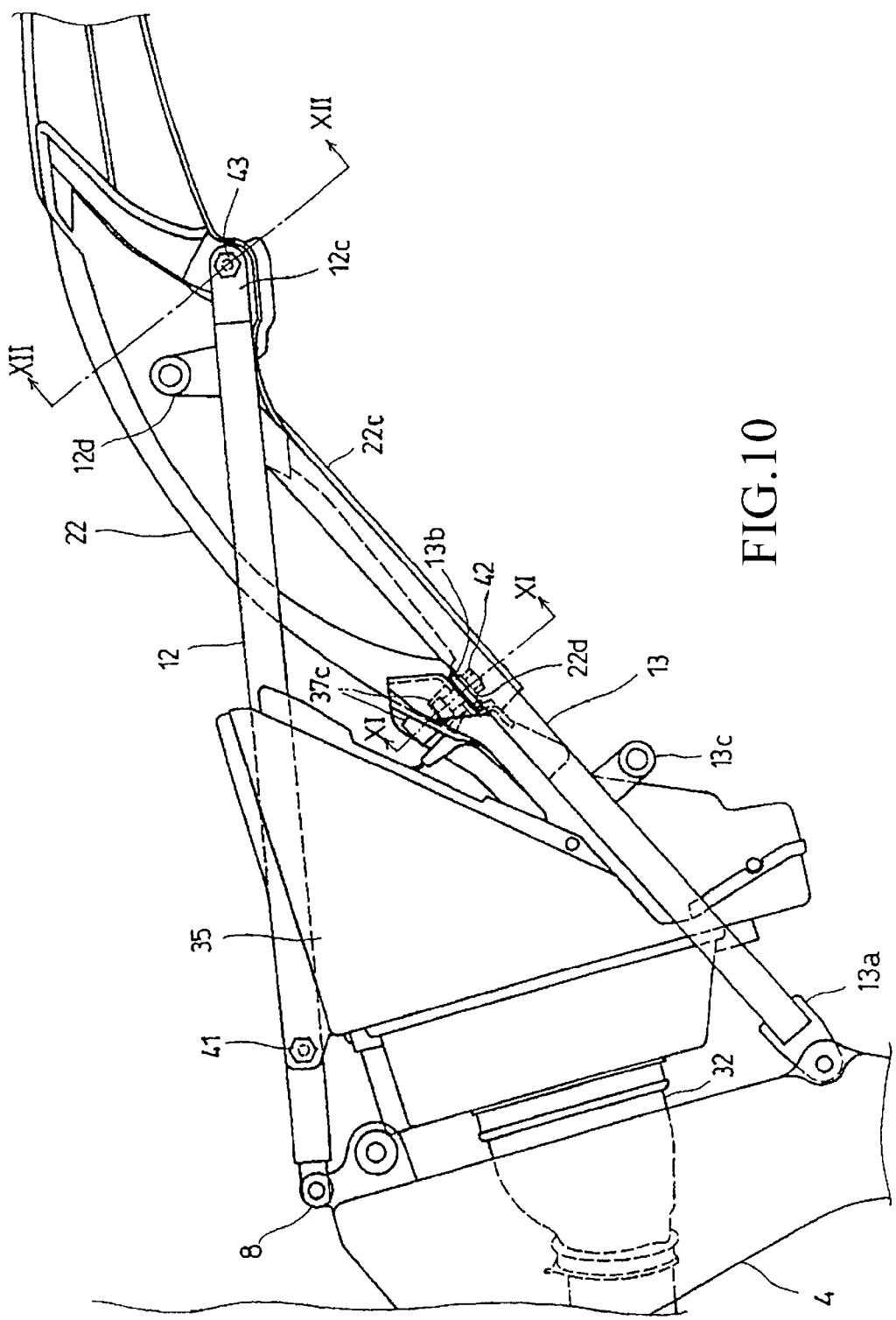
FIG. 10 is a side view of an air cleaner assembly according to an embodiment of the present invention.
Figure 11:
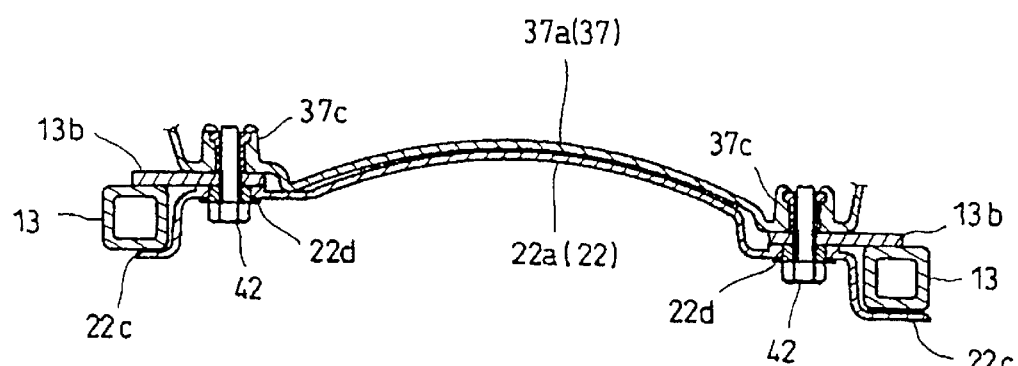
FIG. 11 is a cross-sectional view taken along a line XI—XI in FIG. 10.
Figure 12:
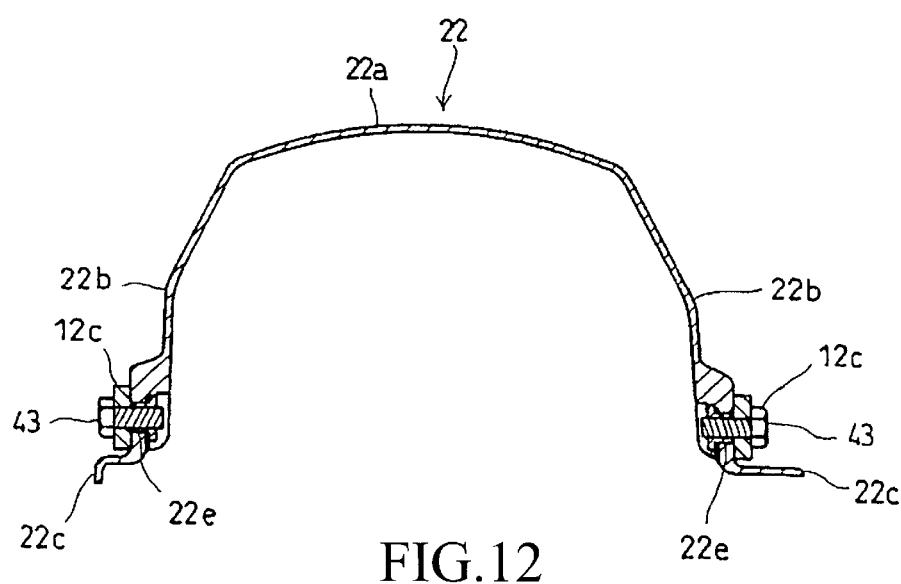
FIG. 12 is a cross-sectional view cut along a line XII—XII in FIG. 10.
Figure 13:
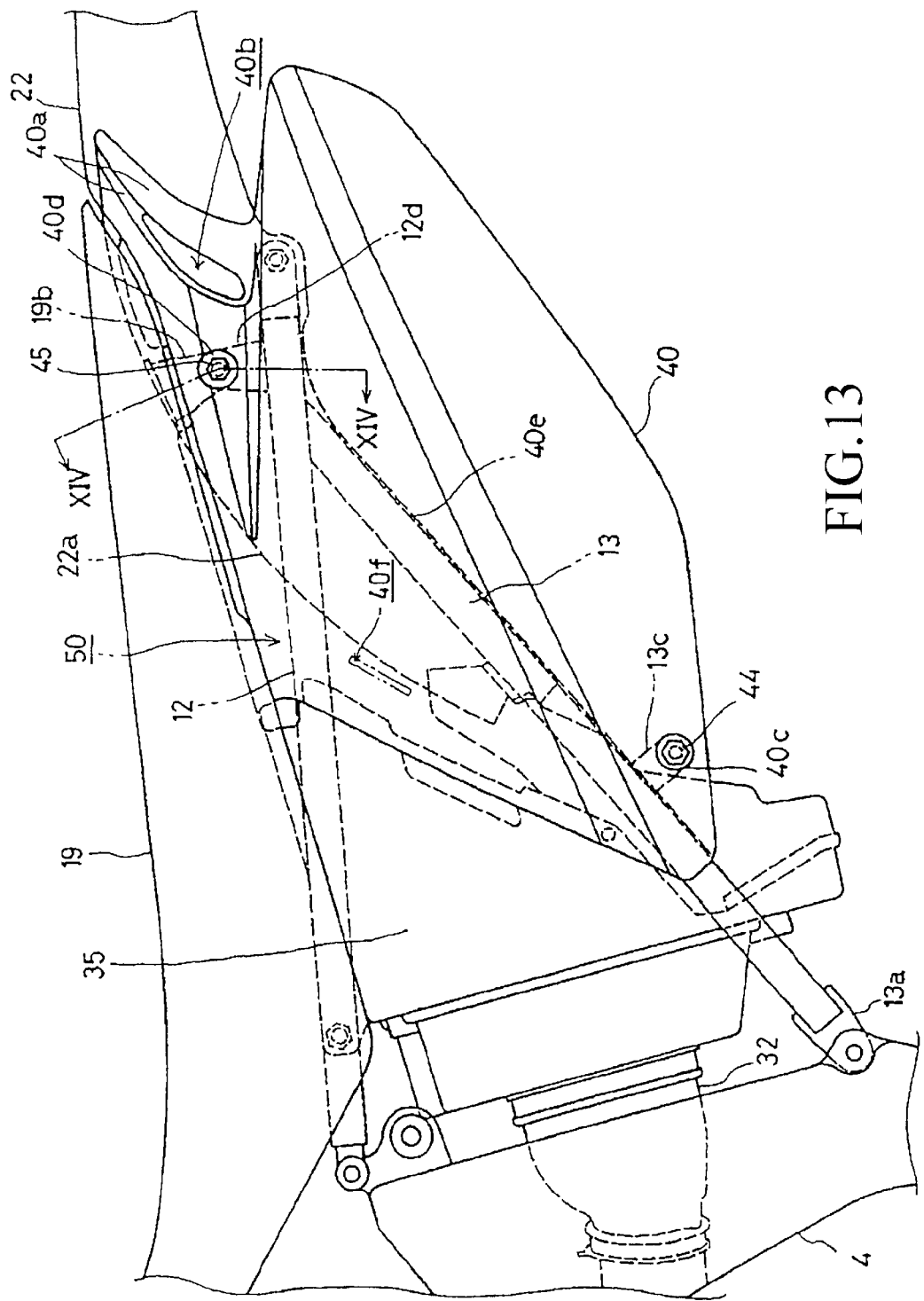
FIG. 13 is an enlarged view of a portion of FIG. 1.
Figure 14:
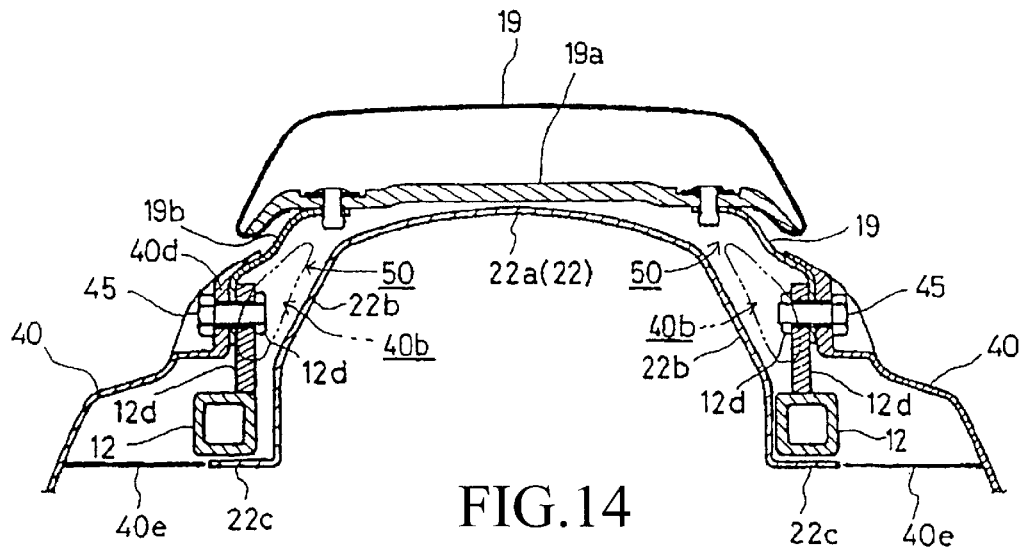
FIG. 14 is a cross-sectional view taken along a line XIV–XVI in FIG. 13.
Figure 15:
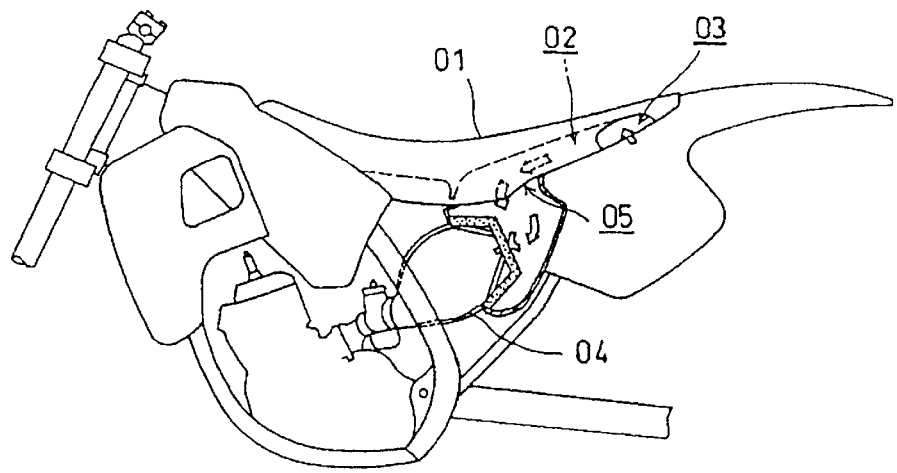
FIG. 15 is a structural view of a portion of a motorcycle having an intake device of the background art.

The present invention will hereinafter be described with reference to the accompanying drawings. FIG. 1 is a side view of a motorcycle according to an embodiment of the present invention. FIG. 2 is a plan view of a sheet rail and a backstay according to an embodiment of the present invention. FIG. 3 is a plan view of an air cleaner according to an embodiment of the present invention. FIG. 4 is a side view of an air cleaner according to an embodiment of the present invention. FIG. 5 is a plan view of a rear fender according to an embodiment of the present invention. FIG. 6 is a side view of a rear fender according to an embodiment of the present invention. FIGS. 7(a)–7(b) are plan views of a side cover according to an embodiment of the present invention. FIG. 8 is a perspective view of a left side cover according to an embodiment of the present invention. FIG. 9 is a plan view showing an air cleaner and a rear fender attached to the sheet rail and the backstay. FIG. 10 is a side view of an air cleaner assembly according to an embodiment of the present invention. FIG. 11 is a cross-sectional view taken along a line XI—XI in FIG. 10. FIG. 12 is a cross-sectional view cut along a line XII—XII in FIG. 10. FIG. 13 is an enlarged view of a portion of FIG. 1. FIG. 14 is a cross-sectional view taken along a line XIV–XVI in FIG. 13.

A vehicle frame of a motorcycle 1 has a pair of left and right main frames 3, 3 extending diagonally downward and rearward from a head pipe 2, and a pair of left and right center frames 4, 4, respectively connected to rear ends of the main frames 3, and extending downward.

Further, a down frame 5 extends downward from the head pipe 2. A pair of lower frames 6, 6, are connected to lower ends of the center frames 4, 4, and branch leftward and rightward from a lower end of the down frame and thereafter extend downward, bend rearward, and extend sideways.

A strengthening pipe 7 is provided between the down frame 5 and the pair of left and right main frames 3, 3. The main frame 3 and the down frame 5 form a square pipe shape having a high strength.

A cross member 8 is provided between the upper ends of the pair of left and right center frames 4, and a bracket 8a projects rearward and diagonally upward from the center of the cross member 8. An upper end of the rear shock absorber 23 is supported by a support shaft 9 of the bracket 8a. A pivot 10 pivotally supporting a rear fork 20 is provided in a lower position near the center of the center frames 4, 4.

In the above vehicle frame, a front end of a sheet rail 12 is supported by the support shaft of the bracket 8a. A backstay 13 supports the sheet rail 12 by connecting a rear portion of the sheet rail 12 to a central portion of the center frame 4.

A front fork 14 is pivotally supported on the head pipe 2, and a front wheel 15 is rotatably supported at a lower end of the front fork 14. A front fender 16 is provided above the front wheel 15, and a handlebar 17 expanding leftward and rightward is provided on the head pipe 2.

A fuel tank 18 is mounted over the main frames 3 from an upper position, and the sheet 19 is supported by the sheet rail 12 in the rear of the fuel tank 18.

The rear fork 20 extends rearward and is pivotally supported by the pivot 10 of the center frames 4 at its front end. A rear wheel 21 is rotatably supported at a rear end of the rear fork 20. A rear fender 22 is supported by the sheet rail 12 and the backstay 13 above the rear wheel 21. The rear shock absorber 23 is provided between the support shaft 9 of the bracket 8a and the rear fork 20.

An exemplary internal combustion engine 25 mounted on the vehicle frame is a 4-cycle internal combustion engine. It is provided with a cylinder 26 set approximately upright, between the down frame 5 and the center frames 4, 4.

An exhaust pipe 27 extending from a front exhaust port of the upright cylinder 26 is bent rearward on the vehicle body right side and is connected to a muffler 28. An intake pipe 30 connects a rear inlet port of the cylinder 26 with a carburetor 31 provided in a position rear and close to the cylinder 26. A connecting tube 32 connects an air cleaner 35 with the carburetor 31 and is supported by the rear sheet rail 12 and the backstay 13. It will noted that a side cover 40 extending rearward covers a rear left and right sides of the air cleaner 35.

As shown in FIG. 2, frame connection stays 12a, 12a connected to the central bracket of the cross member 8 provided between the center frames 4 are formed at the respective front ends of the left and right sheet rails 12. Mounting nut bosses 12b, 12b are provided in positions somewhat rear of the frame connection stays 12a. Mounting stays 12c, 12c respectively extending rearward, and mounting nut brackets 12d, 12d, extending upward and positioned somewhat forward of the mounting stays 12c, 12c, are provided at the respective rear ends of the left and right sheet rails 12.

Further, connecting brackets 13a, 13a are formed at respective front ends of the left and right back stays 13, 13 and are connected to the central portions of the center frames 4. Mounting brackets 13b, 13b extending toward each other are formed in the central positions. Mounting nut brackets 13c, 13c, extending diagonally downward, are provided in positions somewhat forward of the mounting brackets 13b, 13b.

As shown in FIG. 3 and FIG. 4, the air cleaner 35 includes a rear case 37 having a downwardly-projecting shape, and the rear case 37 extends rearward and diagonally upward. The rear case 37 is attached in a lower portion of a front wall 36a of a front case 36. The front wall 36a has an opening 36c communicated with the connecting tube 32 and left and right side walls 36b.

Flanges 36d, 36d, extending frontward and rearward, are formed upright at upper end edges of the left and right side walls 36b, 36b of the front case 36. Mounting brackets 36e, 36e extend forward from front ends of the flanges.

The rear case 37 is formed with a shape projecting downward and having a bottom wall 37a and left and right side walls 37b, 37b. Mounting nut bosses 37c, 37c are formed in rear left end and right end portions of the bottom wall 37a.

The front case 36 and the rear case 37 form a box-shape that opens upward. In the box, a cylinder case 38a is provided so as to cover an opening 36c of the front wall 36a of the front case 36 from inside, and a cleaner element 38 extends along a bottom wall of the cylinder case 38a.

As shown in FIG. 5 and FIG. 6, the rear fender 22, an upper wall 22a having a channel-shaped cross section with an opened bottom, and left and right side walls 22b, 22b, extend forward and rearward. The left and right side walls 22b are relatively long and are bent into the shapes shown in FIG. 4 and FIG. 5 in one embodiment.

Flanges 22c, 22c extending in left and right outward directions are formed at lower end edges of the left and right side walls 22b, 22b. Mounting nut bosses 22d, 22d are formed on front ends of both flanges 22c. Mounting nut bosses 22e, 22e are formed in central and lower portions of the left and right side walls 22b, 22b.

As shown in FIG. 7 and FIG. 8, the left and right side covers 40, 40 have approximately symmetrical shapes, with side walls distorted to be expanded in left-outward and right-outward directions. A side wall rear upper portion is bent inward diagonally forward and rearward to form a bent wall 40a. A large inlet port 40b for introduction of air into the bent wall 40a is formed in the bent wall 40a. Accordingly, the inlet port 40b is opened in an approximately frontward and rearward direction.

Mounting bosses 40c, 40d are formed in a front lower portion of the side wall of the side cover 40 and in a somewhat forward portion of the bent wall 40a of the rear upper portion of the side cover 40, respectively. Flanges 40e, 40e project from inner surfaces of the side covers 40, 40, from the front lower portion toward the rear upper portion.

Among the above elements, the integrally joined sheet rail 12 and the backstay 13 to which the air cleaner 35 and the rear fender 22 are attached, are shown in the plan view of FIG. 9 and a side view of FIG. 10.

Regarding the air cleaner 35, the flanges 36d, 36d of upper end edges of the front case 36 are provided outside along the sheet rails 12, 12. The mounting brackets 36e, 36e at a front end are fixed to the mounting nuts 12b, 12b of the sheet rails 12, 12 by bolts 41, 41. The mounting nut bosses 37c, 37c at a rear end of the rear case 37 are fixed on the mounting brackets 13b, 13b in central portions of the backstays 13, 13 by bolts 42, 42. Accordingly, the air cleaner is supported by pairs of front and rear support points.

The rear fender 22 is provided between the left and right sheet rails 12, 12, and the backstays 13, 13 in the rear of the air cleaner 35. The mounting nut bosses 22e, 22e in central portions of the left and right side walls 22b, 22b are aligned with the mounting brackets 12c, 12c at the rear ends of the sheet rails 12, 12 and are fixed by bolts 43, 43 (See FIG. 12). The mounting nut brackets 22d, 22d at the front ends come into contact with the mounting brackets 13b, 13b of the backstays 13, 13 from the lower side and are fixed by the bolts 42, 42 (See FIG. 11). Accordingly, the rear fender is supported by pairs of front and central points.

As shown in FIG. 11, the mounting brackets 13b, 13b of the backstays 13, 13 are brought into contact with the mounting nut bosses 37c, 37c of the air cleaner 35 from the upper side and with the mounting nut bosses 22d, 22d of the rear fender 22 from the lower side. The mounting brackets 13b are then integrally fastened by the bolt 42 screwed in place from a lower position.

A front end edge of the rear fender 22 is aligned with a rear end edge of the bottom wall 37a of the rear case 37 of the air cleaner 35 from a lower position. The bottom wall 37a of the rear case 37 is connected with the upper wall 22a of the rear fender 22.

Accordingly, the bottom wall 37a of the box that is opened upward and formed with the front case 36 and the rear case 37 of the air cleaner 35 is in communication with the upper wall 22a of the rear fender 22 and extends rearward.

The flanges 22c, 22c, extending outward in left and right directions from the front half of the rear fender 22, project along the backstay 13 and a lower surface of the rear portion of the sheet rail 12 (See FIGS. 11, 12 and 14). The left and right side covers 40, 40 cover the left and right sides of the rearward extending portions of the rear fender 22.

As seen in FIG. 13, the side cover 40 has a mounting boss 40c in the front lower portion aligned with the mounting nut bracket 13c in a position somewhat forward of the center of the backstay 13 and fixed by a bolt 44. The mounting boss 40d in the rear upper portion is aligned with the mounting nut bracket 12d of the sheet rail 12 extending upward and is fixed by a bolt 45. Accordingly, the side cover is attached to the sheet rail 12.

The flange 40e in an inner surface of the side cover 40 is provided along a lower surface of the backstay 13 and a rear portion of the sheet rail 12. Thus, the space opens upward, surrounded by the rear fender 22 and the left and right side covers 40, 40. The internal space in the box opens upward on the air cleaner 35 in communication with the above space. The spaces are covered by a sheet 19 from an upper position (See FIG. 12).

As shown in FIG. 14, the symmetrical support brackets 19b, 19b are vertically set downward with upper ends fixed in left and right predetermined positions of a bottom plate 19a of the sheet 19. Mounting portions at lower ends of the support brackets 19b, 19b are brought into contact with the mounting nut brackets 12d, 12d of the sheet rails 12, 12 and extend upward from the outside. Further, the mounting portions contact with the mounting boss 40d in the rear upper portion of the side covers 40, 40 from the outside, and are integrally fastened by the bolt 45.

The bottom plate 19a of the sheet 19 covers the box of the air cleaner 35 from an upper position, and covers the left and right side covers 40, 40 from an upper position. An intake passage 50 is constructed with the sheet 19 as an upper wall, the left and right side covers 40, 40 as left and right side walls, and the rear fender 22 as a bottom wall. The intake passage 50 is in communication with the upper opening of the air cleaner 35.

Note that as shown in FIG. 14, in a rear portion of the intake passage 50, the sheet bottom plate 19a and the upper wall 22a of the rear fender 22 are positioned close to each other. The intake passages 50, 50 are separately formed between the side covers 40, 40 and the left and right side walls 22b, 22b of the rear fender 22 on the left and right sides such that interference with tires of the vehicle can be avoided.

Rear ends of the separate left and right intake passages 50, 50 are closed by bent walls 40a, 40a in the rear upper portions of the side covers 40, 40. Inlet ports 40b, 40b formed in the bent walls 40a, 40a communicate the outside with the intake passages 50, 50.

As described above, the intake passage 50 connected to the upper opening of the air cleaner 35 is formed with the sheet 19, the rear fender 22 and the side covers 40, 40. The inlet port 40b from the outside of the intake passage 50 is opened rearward in the rear upper portion of the side cover 40.

Accordingly, since air is drawn linearly into the intake passage 50 inside the side cover 40 from the inlet port 40b and introduced to the air cleaner 35, the intake airflow can be smoothed and intake resistance can be reduced.

As shown in FIG. 14, since the inlet port 40b is positioned between the sheet rail 12 and the sheet 19, the sheet rail 12 can be used as an intake guide that helps to obtain smoother intake airflow. Since the inlet port 40b is in the rear upper portion of the side cover 40, the inlet port 40b is not influenced or contaminated by dirt or debris. Further, since the intake passage 50 is formed under the sheet 19 between the rear fender 22 and the side cover 40, a separately formed intake member solely dedicated to the formation of an intake passage is not required.

It may also be arranged such that a slit second inlet port 40f, as represented by an alternate long and two short dashed line in FIG. 13, is provided in the respective side surfaces of the left and right side covers 40 for increasing the amount of intake air.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle intake structure comprising:
    an air cleaner provided under a sheet and having an upper opening;
    a rear fender;
    a side cover having a rear upper portion;
    an intake passage operatively connecting the upper opening of said air cleaner, wherein said intake passage is integrally formed by the sheet, the rear fender and the side cover; and
    an external inlet port of said intake passage opening rearward in the rear upper portion of said side cover.

2. The motorcycle intake structure according to claim 1, wherein said intake passage is formed in a position underneath said sheet and between said rear fender and said side cover.

3. The motorcycle intake structure according to claim 2, wherein said inlet port is provided between a sheet rail and said sheet.

4. The motorcycle intake structure according to claim 1, wherein said inlet port is provided between a sheet rail and said sheet.

5. The motorcycle intake structure according to claim 1, further comprising:
    a rear sheet rail;
    a backstay; and
    a connecting tube connecting the air cleaner with a carburetor, said rear sheet rail and said backstay supporting said connecting tube.

6. The motorcycle intake structure according to claim 1, wherein said side cover extends rearward and covers a rear left side and a rear right side of the air cleaner.

7. A motorcycle intake structure comprising:
    a sheet and a sheet rail;
    a backstay integrally joined with the sheet rail;
    an air cleaner provided under the sheet and having an upper opening;
    a rear fender, wherein the air cleaner and the rear fender are attached to the sheet rail and the backstay;
    a side cover having a rear upper portion;
    an intake passage operatively connecting the upper opening of said air cleaner, wherein said intake passage is integrally formed by the sheet, the rear fender and the side cover; and
    an external inlet port of said intake passage opening rearward in the rear upper portion of said side cover.

8. The motorcycle intake structure according to claim 7, wherein said sheet rail includes a left sheet rail and a right sheet rail.

9. The motorcycle intake structure according to claim 8, wherein the rear fender is provided between the left and right sheet rails and the backstays in a position rearward of the air cleaner.

10. The motorcycle intake structure according to claim 7, wherein said air cleaner includes
    a front case;
    a rear case having a downwardly-projecting shape and attached in a lower portion of a front wall of the front case, said front wall having an opening in communication with a connecting tube and left and right side walls.

11. The motorcycle intake structure according to claim 10, said air cleaner further including
    a cylinder case covering the opening of the front wall; and
    a cleaner element extending along a bottom wall of the cylinder case, wherein the front case and the rear case form a box-shape that opens upward.

12. The motorcycle intake structure according to claim 11, wherein the rear fender, an upper wall having a channel-shaped cross section with an opened bottom, and a pair of left and right side walls extend forward and rearward to form the intake passage.

13. The motorcycle intake structure according to claim 10, wherein the rear fender, an upper wall having a channel-shaped cross section with an opened bottom, and a pair of left and right side walls extend forward and rearward to form the intake passage.

14. The motorcycle intake structure according to claim 7, wherein the rear fender, an upper wall having a channel-shaped cross section with an opened bottom, and a pair of left and right side walls extend forward and rearward to form the intake passage.

15. The motorcycle intake structure according to claim 7, wherein said intake passage is formed in a position underneath said sheet and between said rear fender and said side cover.

16. The motorcycle intake structure according to claim 7, wherein said inlet port is provided between a sheet rail and said sheet.

* * * * *